Figure 1:
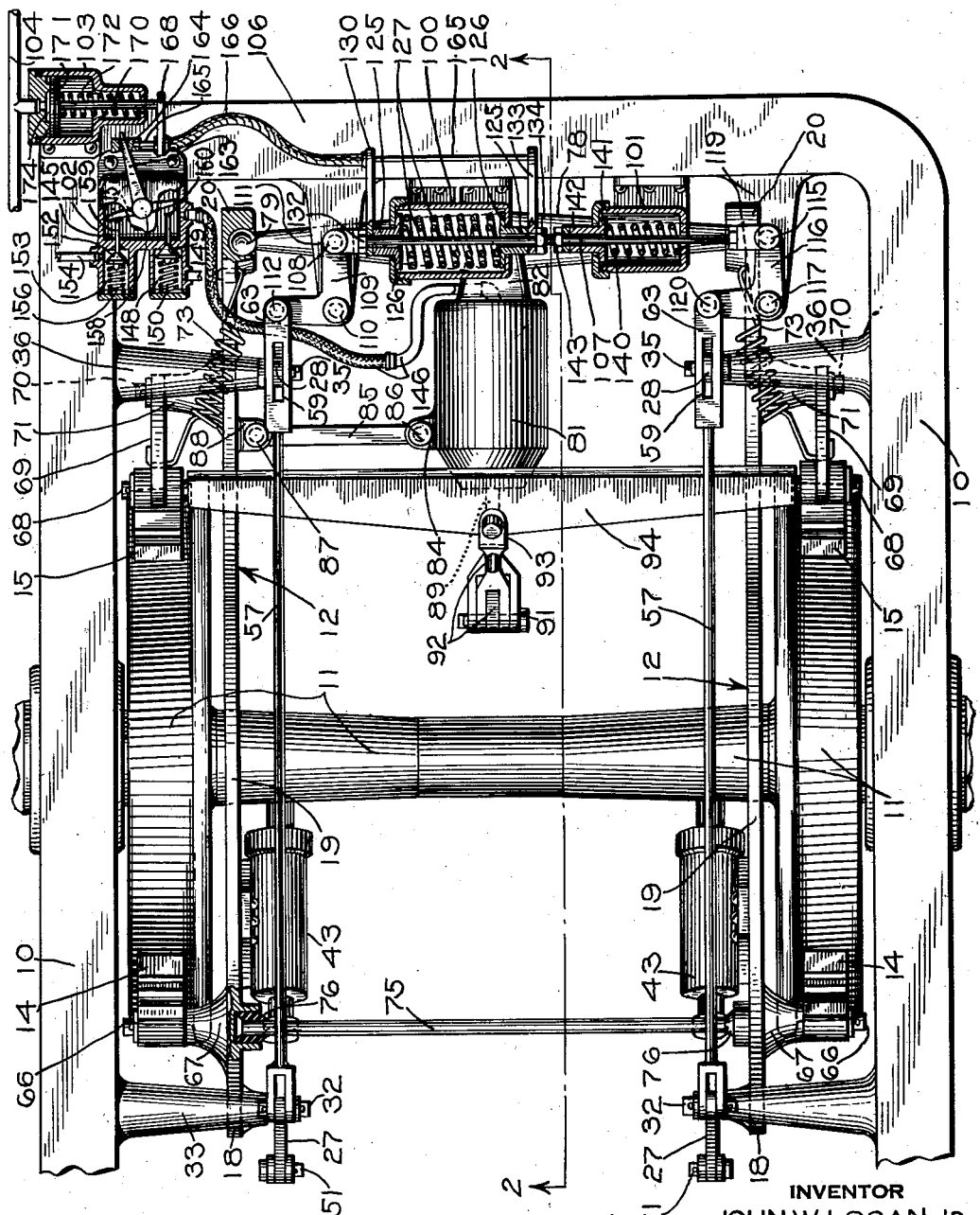

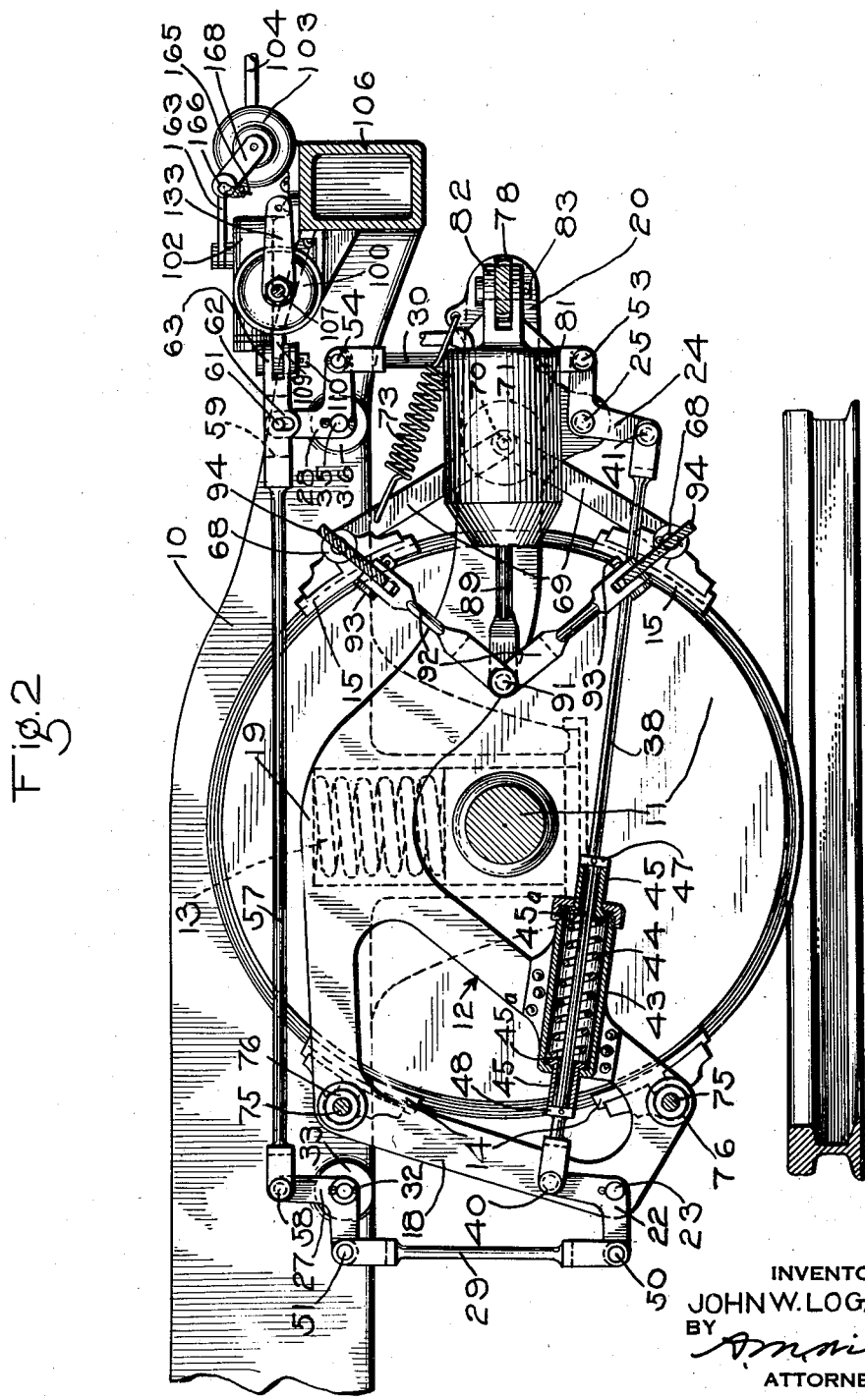

Patented Mar. 25, 1941

2,236,272

UNITED STATES PATENT OFFICE 2,236,272

BRAKE MECHANISM

John W. Logan, Jr., Forest Hills, Pa., assignor to The Westinghouse Air Brake Company, Wilmerding, Pa., a corporation of Pennsylvania Application October 31, 1939, Serial No. 302,141

14 Claims. (Cl. 188—181)

This invention relates to brakes for railway vehicles, and more particularly to a multiple shoe brake mechanism embodying means responsive to braking torque for governing the degree of application of the brakes.

It has been proposed to provide brake equipments for railway trucks having clasp brake assemblies of more than the usual two brake shoes for each wheel, in order to obtain sufficient frictional braking force to control the vehicle during operation thereof at high speed. In designing such a brake mechanism for certain classes of railway vehicle trucks, difficulty is sometimes experienced in providing adequate clearance between operating parts of the mechanism and the adjacent elements of the truck frame, and in the operation of a multiple shoe brake mechanism the several brake shoe elements may necessarily be mounted in such a manner as to result in undesirable operating conditions, such as unequal loading of the brake shoes.

One object of my invention is to provide an improved truck brake mechanism of the type employing more than two brake shoe elements for each wheel, the operating parts of which are constructed and arranged to insure equalization of the forces with which the individual shoes are applied to the vehicle wheel or other rotating member, the assembled elements of the mechanism being adapted when mounted on the truck to provide adequate clearance with respect to structural members associated with the vehicle body.

Another object of the invention is to provide improved means for supporting a truck brake mechanism and for measuring the braking torque produced during an application of the brakes.

It is a further object of the invention to provide an improved multiple shoe brake mechanism of the above type having associated therewith means automatically operative to regulate the force with which the brake shoes are applied to the wheel and axle assembly in accordance with relative variations in a control pressure and in the braking torque produced.

Other objects and advantages of the invention will be apparent in the following more detailed description thereof, taken in conjunction with the accompanying drawings, wherein Fig. 1 is a diagrammatic plan view of a portion of a railway truck having mounted thereon a brake equipment, shown partly in section, embodying the invention; and Fig. 2 is an elevational view of the truck and brake equipment shown in Fig. 1 and taken substantially along the line 2—2 of that figure.

As shown in the drawings, there is provided a vehicle truck, of which only one end portion is illustrated, and which comprises a frame structure including side frames 10, and a wheel and axle assembly indicated generally by the character 11, on which the frame is supported through the medium of suitable journal boxes and truck springs, such as spring 13 shown in Fig. 2 mounted on the vehicle truck is a brake mechanism including a pair of carrier frames 12 operatively suspended from the truck side frames 10 adjacent the respective wheels each of which is adapted to support oppositely disposed pairs of brake heads and shoes 14 and 15.

As is best shown in Fig. 2, each carrier frame 12 is forged or otherwise formed as a flat member of irregular shape comprising a looped end portion 18 disposed at the side of the wheel adjacent the center of the truck, an arcuate middle portion 19 adapted to extend over the axle 11, and a bar portion 20 adapted to project toward the end of the vehicle truck. Each carrier frame 12 is hung from the adjacent side frame member 10 of the vehicle truck through the medium of a linkage mechanism comprising a bell crank lever 22 pivotally mounted on a pin 23 carried by the end 18 of the carrier frame 12, a similar bell crank lever 24 pivotally connected by means of a pin 25 to the bar portion 20 of the carrier frame, a pair of bell crank levers 27 and 28 operatively mounted on the side frame 10 at opposite sides of the wheel 11, and substantially vertically disposed hanger members 29 and 30, the first of which operatively supports the bell crank lever 22 from the bell crank lever 27, while the other hanger member in like manner supports the bell crank lever 24 from the bell crank lever 28.

As is shown in Fig. 1 of the drawings, each of the bell crank levers 27 is journaled on a pin 32 which is mounted on an inwardly extending bracket 33 carried by the adjacent side frame member 10, the bell crank lever 27 being thus disposed in a plane parallel to that occupied by the associated carrier frame 12, which is in turn located at the inner side of the wheel 11. Similarly, the bell crank lever 28 at each side of the vehicle truck is pivotally mounted on a pin 35 which is carried by an inwardly extending bracket 36 formed on the side frame 10, the bell crank lever 28 being in longitudinal alignment with the bell crank lever 27. It will be observed in Fig. 2 that the hanger member 29 is pivotally connected to an outwardly extending arm of the bell crank lever 22 by means of a pin 50, and to a similarly disposed arm of the bell crank lever 27 by means of a pin 51. It will further be noted that the respective ends of the other hanger member 30 are pivotally connected by pins 53 and 54 to outwardly extending arms of the bell crank levers 24 and 28.

The linkage mechanism operatively supporting each carrier frame 12 further includes a movable connecting rod 38, one end of which is pivotally connected by means of a pin 40 to an upwardly extending arm of the bell crank lever 22, and the opposite end of which rod is pivotally connected by means of a pin 41 to a downwardly extending arm of the bell crank lever 24, the bell crank levers being thus adapted for rotation in opposite directions about the respective pins 23 and 25 as the rod 38 is shifted from a normal position, for a purpose hereinafter explained. The rod 38 extends through the open ends of a hollow spring casing 43, which is riveted or otherwise secured to the inner side of the looped portion 18 of the carrier frame 12, and which has mounted therein a coil spring 44 that is interposed between a pair of sleeve elements 45, each of which is slidably mounted in one end of the casing 43 and extends outwardly thereof. Flanges 45a are formed on the sleeve elements for engaging the respective end walls of casing 43. Collar elements 47 and 48 are secured to the rod 38 at opposite ends of spring casing 43, and are each adapted for engagement with the corresponding movable sleeve element 45 as shown in Fig. 2, so that movement of the rod 38 in either direction will be resisted by the coil spring 44, as hereinafter more fully explained. It should be understood that sufficient clearance space is provided between the rod 38 and the respective sleeve elements 45, and between the sleeve elements and the end portions of the spring casing 43, to permit slight angular adjustment of the rod with respect to the casing under operating conditions.

The two bell crank levers 27 and 28 carried by each side frame 10 of the truck are operatively connected together by means of a torque rod 57, one end of which is journaled on a pin 58 carried by an upwardly extending arm of the bell crank lever 27, and the other end of which rod has a vertical slot 59 formed therein for receiving the upwardly extending arm of the bell crank lever 28. A stud 61 is carried by the arm of the bell crank lever 28 and engages in laterally disposed slots 62 formed in the end of the torque rod 57 for permitting relative movement of said elements as hereinafter set forth. The torque rod 57 has a clevis portion 63 formed on the end thereof beyond the slot 59, which clevis portion is operatively connected with a torque control mechanism hereinafter described.

Each carrier frame 12 is adapted to support the brake shoes and heads 14 through the medium of laterally disposed pins 66, which are mounted in suitable bores formed in lug portions 67 of the carrier frame (see Fig. 1), which lug portions extend outwardly into the plane of the adjacent vehicle wheel, the brake shoes being thus adapted to be moved into engagement with the wheel tread. The other pair of brake shoes and heads 15 carried at the opposite side of each wheel 11 are pivotally connected by means of suitable pins 68 to the ends of a pair of levers 69, respectively, the other ends of which levers are journaled on a common pin 70 that is secured to a lug portion 71 formed on the carrier frame 12, as may be seen in Fig. 1. The levers 69 at each side of the truck are oppositely disposed within the plane of the adjacent wheel 11, and at angles substantially tangential with respect thereto, and are normally held in their release position, as illustrated, under the force of suitable biasing means, such as a tension spring 73 which may be connected to the upper of said levers and to a lug carried by the bar portion 20 of the corresponding carrier frame.

Referring to Fig. 1 of the drawings, the two laterally spaced carrier frames 12 are adapted to be maintained in substantially parallel relation by suitable means such as a tie rod 75, the opposite ends of which are mounted in flexible rubber gripping elements 76 that are secured within suitable apertures formed in the respective carrier frames, the tie rods being adapted to permit slight relative play or movement of the carrier frame in following the corresponding wheels as they move over irregularities in the rails, particularly during application of the brakes as hereinafter explained. Connecting the outer ends or bar portions 20 of the two carrier frames 12 is a brake cylinder beam 78, having rounded end portions 79, each of which is seated within a suitable socket formed in the bar portion 20 of each carrier frame 12, as shown in Fig. 1.

Centrally disposed with respect to the brake cylinder beam 78 and extending longitudinally of the truck frame is a brake cylinder device 81, the casing of which, as shown in Fig. 2, is provided with a clevis portion 82 adapted to be fitted over the brake cylinder beam 78 and pivotally connected thereto through the medium of a pin 83. A tie rod 85 is pivotally connected to a suitable lug portion 84 of the brake cylinder casing by means of a pin 86 and to a suitable lug 88 carried by one of the carrier frames 12 through the medium of a pin 87 for maintaining the brake cylinder device 81 against excessive movement out of normal alignment with the associated elements, while permitting relatively slight yielding of the connected parts during an application of the brakes while the vehicle is moving along the track. The brake cylinder device 81 is of the usual type having a piston, not shown, which is responsive to an increase in the pressure of fluid applied thereto for operating a piston rod 89. The outer end of the piston rod 89 is formed as a clevis and is pivotally secured by means of a pin 91 to the ends of a pair of pull rods 92, the outer ends of which are pivotally connected by means of pins 93 to brake beams 94, respectively, each of which is disposed transversely of the truck frame and is secured or formed integrally with the corresponding brake shoe pins 68 carrying brake shoes and heads 15.

Associated with the clasp brake apparatus already described is a torque responsive fluid pressure brake control equipment adapted for operation according to variation in the pressure of fluid in a control pipe for governing the supply and release of fluid under pressure to and from the brake cylinder device 81, which equipment is similar in some respects to that shown and described in my copending application filed in the United States Patent Office on March 23, 1939, Serial No. 263,591. As is best shown in Fig. 1 of the drawings, the torque control equipment includes a spring casing 100, an auxiliary spring casing 101, a mechanically actuated control valve device 102, and a control cylinder device 103 adapted to respond to the variations in the pressure of fluid in a control pipe 104 extending throughout the train, all of which devices are secured to the usual end piece 106 by bolts or other suitable means.

The spring casings 100 and 101 are aligned transversely of the vehicle truck and have operatively mounted therein a thrust rod 107, the opposite ends of which extend outwardly beyond the respective spring casings. The outer end of the thrust rod 107 adjacent the spring casing 100 is pivotally connected by means of a pin 108 to one arm of a bell crank lever 109, which is journaled on a pin 110 carried by a bracket portion 111 formed on the end piece 106 of the truck frame. The other arm of the bell crank lever 109 is pivotally connected through the medium of the pin 112 to the clevis portion 63 of the adjacent torque rod 57, the bell crank lever being so disposed that movement of the torque rod 57 toward the center of the truck, or to the left as shown in Fig. 1, will effect movement of the thrust rod 107 to carry pin 108 away from the spring casing 100, while movement of the torque rod 57 to the right will effect movement of the pin 108 toward the spring casing. The other end of the thrust rod 107 projecting beyond the spring casing 101 carries a pin 115 which forms a pivotal connection with a bell crank lever 116 that is journaled on a pin 117, which is in turn mounted on a bracket portion 119 of the truck frame. The other arm of the bell crank lever 116 is pivotally connected by means of a pin 120 with the clevis portion 163 of the torque rod 57 on that side of the vehicle truck. It will be noted that the bell crank levers 116 and 109 are thus adapted to rotate together and in the same direction when the torque rods 57 are simultaneously actuated during an application of the brakes, as will hereinafter be explained.

A pair of spring seat elements 125 are loosely mounted within the openings in the ends of the spring casing 100 in sliding relation with the thrust rod 107, and have formed thereon annular collar portions 126 that are adapted for engagement with the end walls of the spring casing for limiting outward movement of the respective spring seat elements. Interposed between the spring seat elements 125 are a plurality of springs 127, which are adapted to resist inward movement of either element with respect to the spring casing 100. Slidably mounted on the thrust rod 107 and projecting above the end portion 106 of the truck frame is an arm 130, which engages and may be secured to the spring seat element 125 adjacent thereto, and which is adapted to be operatively engaged by a nut 132 carried by the thrust rod. At the opposite end of spring casing 100 a similar arm member 133 is slidably mounted on the thrust rod 107 in association with the adjacent spring seat element 125, which arm member is adapted to be operatively engaged by a nut 134 secured to the thrust rod. It will thus be apparent that if the thrust rod 107 is moved in one direction the nut 132 thereon will carry with it the associated arm 130 and spring seat 125 against the force of the springs 127 while the other arm 133 is held stationary, and if on the other hand the thrust rod is moved in the opposite direction the nut 134 will cause inward movement of the arm 133 and spring seat member 125 with respect to the spring casing while the arm 130 is held against movement.

Within the spring casing 101 is disposed a coil spring 140 which is adapted to act against a collar portion 141 of a movable spring seat member 142, which is loosely mounted within the end opening of the spring casing and extends in sliding relation with the thrust rod 107 into operative engagement with a nut 143 carried by the thrust rod. The spring 140 is adapted to aid the springs 127 in resisting movement of the thrust rod 107 in response to clockwise rotation of the bell crank levers 109 and 116, as viewed in Fig. 1. When on the other hand the thrust rod 107 is moved in the opposite direction in response to counterclockwise turning of the bell crank levers 109 and 116, the spring 140 is adapted to remain ineffective, so that only the springs 127 can resist such movement of the thrust rod. As will hereinafter more fully be explained, this arrangement of the springs 127 and 140 with respect to the thrust rod 107 is designed to permit application of a greater braking force on the wheel and axle assembly 11 when that assembly is leading, than the braking force applied to said wheel and axle assembly when it constitutes the rear or trailing wheel and axle assembly.

The control valve device 102 comprises a casing having a chamber 145, which communicates by way of a conduit 146 with the pressure chamber of the brake cylinder device 81. The casing of the control valve device 102 also has formed therein an inlet valve chamber 148 communicating with a source of fluid under pressure, not shown, and containing an inlet valve element 149, that is adapted to be held in the normal seated position under the force of a spring 150. An exhaust valve element 152 is operatively mounted within an exhaust valve chamber 153, which is formed in the casing adjacent the chamber 148 and communicates by way of a pipe 154 with the atmosphere, and also by way of a communication controlled by the exhaust valve element with the chamber 145. A spring 156 is provided for urging the exhaust valve element 152 toward seated position. Within the chamber 145 is mounted a valve actuating mechanism comprising a lever 157 secured to a centrally disposed pin 158, which is journaled in the casing. One end of the lever 157 is adapted to engage a valve stem 159 connected through the exhaust valve element 152, and the other end thereof is similarly engageable with a valve stem 160 for operating the supply valve element 149.

Forming part of or secured to the pin 158 is an arm 163, which is disposed outwardly of the casing of the control valve device 102 and operatively engages a ring member 164 carried on the end of a Bowden wire 165. The Bowden wire 165 is of the usual construction and extends slidably through a flexible tube 166, one end of which tube is secured to an arm 168 aligned with the control cylinder device 103. The other end of the flexible tube 166 is secured to the outermost portion of the arm 130 associated with the spring casing 100, the arm 130 being suitably apertured to accommodate the adjacent portion of the Bowden wire 165, which in turn is secured to the other arm 133. As is shown in Fig. 1, the Bowden wire 165 and tube 166 are of sufficient length to provide the curvature thereof required for effecting movement of the Bowden wire in response to operation of the flexible tube, without interference with independent operation of the Bowden wire when the tube is held stationary.

The free end of the arm 168 to which one end of the flexible tube 166 is secured is fastened by suitable means to the outer end of a piston rod 170, which is slidably mounted in the casing of the control cylinder device 103. The piston rod 170 is operative by a piston 171, which is slidably mounted within the casing and is subject to the opposing pressures of a coil spring 172 and of fluid in a chamber 174 communicating with the control pipe 104.

*Operation*

When the brake mechanism is in release position, as illustrated in the drawings, the control pipe 104 is connected with the atmosphere through suitable communications in the usual brake valve device, not shown, and the spring 172 is thus permitted to maintain the piston 171 and rod 170 in the innermost position thereof. The arm 168 thereby positions the flexible tube 166 and Bowden wire 165 for maintaining the control valve device 102 in release position, the arms 163 and lever 157 being thus adapted to hold the release valve 152 away from its seat while permitting the spring 150 to maintain supply valve 149 in seated position. With the control valve device 102 disposed in release position, the piston chamber of the brake cylinder device 81 is connected to the atmosphere by way of the conduit 146, chamber 145 of the control valve device, valve chamber 153, and discharge pipe 154.

The usual release spring mounted within the brake cylinder device 81 and not shown in the drawings, together with release springs 73 acting on the individual brake lever assemblies, are thereby permitted to act through the medium of the pull rods 92 and other operative members on the brake assembly already described to maintain the pairs of brake shoes 15 and 14 at each side of the truck out of engagement with the wheels 11. Both carrier frames 12 and the elements mounted thereon are thus adapted to assume normal free-hanging positions, with the entire weight of each supported through the medium of the hanger members 29 and 30, as shown in Fig. 2.

When it is desired to effect an application of the brakes, fluid under pressure is supplied in the usual manner to the control pipe 104 to effect an increase in the fluid pressure therein corresponding with the desired degree of application of the brakes, and the pressure of fluid thus admitted to the piston chamber 174 moves the piston 171 and rod 170 outwardly against the force of spring 172. The arm 168 is carried outwardly with the piston rod and moves the end of the tube 166 connected thereto, together with Bowden wire 165, for effecting movement of the arm 163, lever 157 and pin 158 in a clockwise direction, it being understood that both the Bowden wire and tube are thus adapted to be operated simultaneously since the opposite ends thereof connected to arms 130 and 133 are maintained against movement by the force of springs 127. As the lever 157 is thus turned in a clockwise direction, the stem 159 is operated to permit movement of the release valve 152 into seated position, where it is maintained under the force of spring 156, while the stem 160 is operated to unseat the supply valve 149 against the force of spring 150. With the supply valve 149 in unseated position, fluid under pressure is quickly supplied from the usual source, not shown, by way of valve chamber 148, chamber 145, and conduit 146 to the piston chamber of brake cylinder device 81.

Upon the supply of fluid under pressure to the brake cylinder device, the piston rod 89 is forced outwardly by operation of the usual piston, and acts through the medium of the pin 91, pull rods 92, and beams 94 to draw the brake shoes 15 into engagement with the wheels 11, as may best be understood by reference to Fig. 2. At substantially the same time, each brake carrier frame 12 is pulled to the right, as viewed in Fig. 2, under the reactive force exerted through the medium of the brake cylinder casing carried by the carrier frame, so that the other brake shoes 14 are brought into engagement with the tread of the wheel 11. It will be readily understood that since the two pairs of brake shoes 14 and 15 are disposed in clasp arrangement with respect to each wheel 11, the force exerted by operation of the brake cylinder device 81 is distributed substantially equally among the four brake shoes regardless of the pressure of fluid supplied by the brake cylinder device.

It will be understood that the vertical distance between the axle 11 and the adjacent side frame 10 of the vehicle truck, which is supported through the medium of the truck springs such as spring 13, will vary under different vehicle load conditions, and that while the axle is moving along the track the wheel and axle assembly is constantly subjected to vertical movement with respect to the truck frame due to various irregularities in the rails. The brake mechanism constructed in accordance with the invention is not, however, adversely effected by such vertical relative displacement of the wheels with respect to the frame, the carrier frames 12 and associated brake shoes being constructed and arranged to follow the associated wheel and axle assembly 11 during an application of the brakes without interfering with the usual action of the truck springs 13.

Assuming, for example, that the wheel 11 is spaced a greater distance from the side frame 10 than is the case in Fig. 2 of the drawings, and that the brake shoes 14 and 15 are operated to clasp the wheel in braking relation therewith, it will be apparent that the carrier frame 12 is thereby pulled downwardly so that the bell crank lever 22 is turned in a clockwise direction about the pin 23 while bell crank lever 24 is turned in a counterclockwise direction about the pin 25, since the arms of the levers respectively secured to the pins 50 and 53 are anchored through the medium thereof to the side frame. In thus rotating the two bell crank levers shift the connecting rod 38 toward the right, as viewed in Fig. 2, against the opposing force of the spring 44, which is partly compressed through the medium of the collar 48 and the sleeve member 45.

On the other hand, if the wheel 11 is displaced upwardly with respect to the side frame 10 of the truck shown in Fig. 2, the carrier frame 12 and associated elements are adapted to follow such movement, the bell crank lever 22 being in that case rotated in a counterclockwise direction about the pin 23 while the bell crank lever 24 is turned in a clockwise direction about the pin 25, so that the rod 38 is shifted to the left against the opposing pressure of the spring 44. It will be understood that each carrier frame 12 is thus operative to follow the adjacent wheel 11 without interfering with similar action of the opposite carrier frame associated with the same wheel and axle assembly, because of the yieldable connection maintained between the two carrier frames through the medium of the connecting rods 75 and the pivotally mounted brake cylinder beam 78.

Meanwhile, with the brake shoes 14 and 15 in braking engagement with the wheels 11, the carrier frames 12 are subjected to braking torque corresponding to the force with which the shoes are applied to the wheels. Assuming that the wheel 11 shown in Fig. 2 is disposed at the leading end of the truck and is thus rotating in a clockwise direction, the torque transmitted to the carrier frame 12 through the medium of the brake shoes 14 and 15 tends to effect downward movement of the bar portion 20 and upward movement of end portion 18. It will be evident that as the carrier frame 12 is thus subjected to braking torque, tending to tilt the frame in a clockwise direction with respect to the wheel and axle 11, the position of the connecting rod 38 and bell crank levers 22 and 24 relative to the carrier frame is not altered, since the forces on those members are balanced, and that consequently the hanger member 30 is pulled downwardly while the other hanger member 29 is forced upwardly. The bell crank levers 27 and 28 carried by the side frame 10 are thereby partially turned about the respective pins 32 and 35 so as to shift the torque rod 57 to the right, as viewed in Fig. 2.

Referring to Fig. 1, it will be understood that the operation just explained is effective to move both torque arms 57 toward the adjacent end of the truck or to the right as viewed in the drawings, and that both bell crank levers 109 and 116 are consequently rotated in a clockwise direction about the corresponding pins 110 and 117 for shifting the thrust rod 107 in opposition to the combined forces of the springs 127 and 140, which springs resist movement of the spring seat members 125 and 141 which are respectively engaged by nuts 132 and 143 and carried with the thrust rod. In so moving, the thrust rod 107 carries with it the arm member 130, which consequently exerts a pulling force on the flexible tube 166, while the other arm member 133 and the adjacent end of the Bowden wire 165 attached thereto are maintained stationary due to engagement of the collar portion 126 of the associated spring seat member 125 with the end of the spring casing 100. As the flexible tube 166 is thus pulled, it tends to straighten, and thereby ejects the outer end of the Bowden wire 165 carrying the ring member 164.

As the Bowden wire 165 is thus moved outwardly from the end of the hollow flexible tube 166 adjacent the control valve device 102, the ring 164 operates the arm 163 to turn the pin 158 and lever 157 in a counterclockwise direction until the supply valve member 149 is moved into engagement with its seat, thereby cutting off further supply of fluid under pressure to the brake cylinder device 81. The brakes are then maintained applied with the desired force as determined by the position in which the arm 168 and piston 171 of the control cylinder device 103 are maintained under the pressure of fluid established in the control pipe 104.

If the force with which the brake shoes engage the wheels should exceed the desired value as predetermined by the pressure of fluid in the control pipe 104 as just explained, the resultant torque is accordingly increased so as to effect further displacement of the two torque rods 57 and consequent operation of the thrust rod 107 and Bowden wire 165 until the control valve device 102 is operated to release position. With the control valve device 102 in release position fluid under pressure is discharged from the brake cylinder device 81 by way of the conduit 146, chamber 145 and past the unseated valve 152, thus initiating release of the brakes. Upon partial lessening in the force with which the brake shoes are applied to the wheels, the consequent reduction in braking torque transmitted through the medium of the carrier frames 12 and torque rods 57 to the thrust rod 107, the springs 127 and 140 become effective to force the thrust rod and the associated elements of the torque measuring mechanism toward their normal position. In moving the thrust rod 107 toward normal position, the springs 127 at the same time act through the medium of the spring seat member 125 and arm 130 to push the adjacent end of the flexible tube 166 away from the other arm 133 which is connected to the Bowden wire 165, and as a result the remote end of the Bowden wire carrying the ring 164 is retracted for operating the arm 163, pin 158 and lever 157 in a clockwise direction until the discharge valve 152 is again moved into engagement with its seat. The control valve device 102 is then in lap position so that the brakes are still maintained applied with the desired force corresponding to the pressure of fluid in the control pipe 104.

When it is desired to effect the release of the brakes the control pipe 104 is connected with the atmosphere by the usual operation of the associated brake valve device, not shown, whereupon the spring 172 becomes effective to force the piston 171 of the control cylinder device, together with the piston rod 170 and arm 168, to the normal position as shown in Fig. 1. As the arm 168 is thus returned to normal or release position the flexible tube 166 and Bowden wire 165 are operated to effect movement of the control valve device 102 to the release position, in which the supply valve 149 is held in engagement with its seat while the release valve 152 is unseated. The pressure of fluid in the brake cylinder device 81 is consequently reduced to that of the atmosphere, so that the piston and piston rod 89 thereof are permitted to return to release position under the force of the various release springs, including the springs 73 acting through the medium of the corresponding brake levers 69 and pull rods 92. In so moving to release position the levers 69 withdraw the brake shoes 15 from engagement with the wheels 11, while the carrier frames 12 and brake shoes 14 carried thereby assume their release positions, as illustrated in Fig. 2 of the drawings.

If the railway truck is traveling in the opposite direction from that assumed for the foregoing description of operation, so that the wheel and axle assembly 11 is disposed at the rear or trailing portion of the truck and is rotating in a counterclockwise direction as viewed in Fig. 2, an application of the brake shoes to the wheels will effect operation of the torque control mechanism in substantially the same manner as has already been explained. In that case, however, the spring 140 carried within spring casing 101 is adapted to remain inoperative to oppose movement of the thrust rod 107 in response to braking torque, so that the control valve device 102 is consequently actuated to maintain higher brake cylinder pressure in proportion to braking torque than that produced with the brake apparatus for the leading wheel and axle assembly of the truck.

Assuming that an application of the brakes is effected while the wheel and axle assembly 11 is rotating in a counterclockwise direction as viewed in Fig. 2, and thus constitutes the trailing assembly of the truck, the braking torque exerted on the carrier frame 12 causes that member to tilt so that the bar portion 20 is raised slightly while the end portion 18 is forced downwardly. As the bar portion 20 is forced upwardly this movement is transmitted through the medium of the pin 25, bell crank lever 24 and hanger member 30 to cause counterclockwise rotation of the bell crank lever 28 about the pin 35, while at the same time the end portion 18 carries downwardly the pin 23, bell crank lever 22 and hanger member 29 so as to effect counterclockwise rotation of bell crank lever 27 about pin 32. The torque rod 57 is thereby shifted to the left, as viewed in Fig. 2, by the movement of the bell crank levers 27 and 28. Referring to Fig. 1 of the drawings, it will be understood that both torque rods 57 are moved to the left at substantially the same time by the operation just explained, while the bell crank levers 109 and 116 are both rotated in the counterclockwise direction for shifting the thrust rod 107 from its normal position against the force of the springs 127, due to engagement of the nut 134 with the arm 133 and spring seat member 135. The spring 140, of course, remains inactive at this time since the thrust rod 107 moves the nut 143 away from the spring seat member 142. Operation of the Bowden wire 165 and flexible tube 166 to actuate the control valve device 102 is then effected, in the manner hereinbefore explained, to control the degree of application of the brakes. It will be observed, however, that since spring 140 is not effective the degree of application of the brakes will be limited to a lower value than when the wheel and axle assembly is the leading unit of the truck. Consequently, the degree of wheel sliding is minimized.

It will thus be seen that a truck brake equipment constructed in accordance with my invention embodies means insuring equal brake shoe loading during an application of the brakes, and provides a normal brake mounting structure which is adapted on the one hand to measure braking torque for effecting automatic regulation of the applied braking force, and on the other hand to permit independent adjustment of an individual brake mechanism to follow vertical motion of the adjacent wheel with respect to the spring carried truck frame.

Although a single embodiment of the invention has been described in detail, it should be understood that I do not intend to limit the scope of the invention to that embodiment or otherwise than by the terms of the appended claims.

Having now described my invention, what I claim as new and desire to secure by Letters Patent is:

1. A brake mechanism for a wheel of a railway truck of the class having a spring supported frame, comprising carrier means, a plurality of brake shoes mounted thereon for movement into braking relation with the wheel, hanger means operatively suspending said carrier means from said frame, and yielding means cooperative with said hanger means for permitting said carrier means and brake shoes to follow vertical movement of said wheel with respect to said truck frame during application of the brakes.

2. A brake mechanism for a wheel of a railway truck of the class having a spring supported frame, comprising braking means operable to apply frictional force to said wheel and axle assembly, hanger means operatively suspending said braking means from said truck frame, and spring-biased linkage mechanism operatively connected to said hanger means for normally maintaining said braking means centered in braking alignment with said wheel and axle assembly, said linkage mechanism being yieldable during an application of the brakes to permit said braking means to follow relative vertical movement of said wheel and axle assembly with respect to said spring supported truck frame.

3. A brake mechanism for a wheel of a railway truck of the class having a spring supported frame, comprising carrier means, a plurality of brake shoes mounted thereon for movement into braking relation with the wheel, hanger means operatively suspending said carrier means from said frame, and yielding means operatively mounted on said carrier means and cooperative with said hanger means during an application of the brakes for causing said carrier means and said brake shoes to follow relative vertical movement of said wheel with respect to said truck frame.

4. A brake mechanism for a wheel of a railway truck of the class having a spring supported frame, comprising carrier means, a plurality of brake shoes mounted thereon for movement into braking relation with the wheel, hanger means operatively suspending said carrier means from said frame, and linkage mechanism operatively connected to said carrier means and hanger means and effective during engagement of said shoes with the wheel to prevent locking of said wheel against free vertical movement thereof with relation to said spring supported truck frame.

5. A brake mechanism for a wheel of a railway truck of the class having a spring supported frame, comprising carrier means, a plurality of brake shoes mounted thereon for movement into braking relation with the wheel, hanger means operatively suspending said carrier means from said frame, spring means mounted on said carrier means, and linkage mechanism yieldingly centered by said spring means and operatively connected to said hanger means for operation, during engagement of said brake shoes with the wheel, to cause said carrier and shoe assembly to follow relative vertical movement of said wheel with respect to said spring supported truck frame.

6. A brake equipment for a wheel and axle assembly of a railway truck of the class having a spring supported frame, comprising a pair of longitudinally disposed brake carrier members, hanger means carried by the truck frame and adapted to support each of said carrier members adjacent a wheel of said assembly, a plurality of brake shoes movably mounted on each of said carrier members in braking relation with the respective wheels, transversely disposed connecting members yieldingly secured at the ends thereof to the two carrier members, and spring-biased linkage mechanism operatively connecting each carrier member with the corresponding hanger means for causing said carrier member to follow vertical movement of the adjacent wheel relative to the truck frame, when the brakes are applied, without appreciable interference with the similar movement of the other carrier member.

7. A brake equipment for a wheel and axle assembly of a railway truck of the class having a spring supported frame, comprising a pair of longitudinally disposed brake carrier members, hanger means carried by the truck frame and adapted to support said carrier members adjacent the wheels of said assembly, a plurality of brake shoes movably mounted on each of said carrier members in braking relation with the respective wheels, spring-biased linkage mechanism operatively connecting each carrier mechanism with the corresponding hanger means for causing said carrier member to follow vertical movement of the adjacent wheel relative to the truck frame, and common actuating means operatively connected to both carrier members for simultaneously operating said two sets of brake shoes.

8. A brake equipment for a wheel and axle assembly of a railway truck of the class having a spring supported frame, comprising a pair of longitudinally disposed brake carrier members, hanger means carried by the truck frame and adapted to support said carrier members adjacent the wheels of said assembly, a plurality of brake shoes movably mounted on each of said carrier members in braking relation with the respective wheels, spring-biased linkage mechanism operatively connecting each carrier mechanism with the corresponding hanger means for causing said carrier member to follow vertical movement of the adjacent wheel relative to the truck frame, a brake cylinder device interposed between and carried by said carrier members, and lever means operatively connecting said brake cylinder device with the brake shoes aligned with both of said wheels.

9. In a brake mechanism for a wheel of a railway truck having a spring supported frame, in combination, a brake carrier member, a plurality of braking shoes operatively mounted on said carrier member for movement into braking relation with said wheels, brake operating means therefor, a torque lever mechanism operatively mounted on said truck frame and adapted to support said carrier member and brake shoes, said torque lever mechanism being responsive to braking torque produced on application of said shoes to the wheel for effecting regulation of said brake operating means, and spring-biased lever means mounted on said carrier member and operative during application of said brake shoes to the wheel to render said carrier member freely adjustable to follow vertical displacement of said wheel relative to said truck frame while effecting operation of said torque lever mechanism.

10. In a brake mechanism for a wheel of a railway truck having a spring supported frame, in combination, a brake carrier member, a pair of brake shoes journaled thereon and operatively aligned with one peripheral side of said wheel, brake lever means pivotally connected to said carrier member and disposed substantially tangential of the wheel, a pair of brake shoes mounted on said brake lever means and operatively aligned with the other side of said wheel, fluid pressure operated brake cylinder means connected to said brake lever means and operative to cause said two pairs of brake shoes to clasp said wheel in braking relation therewith, and hanger means for yieldingly supporting said carrier member and the elements mounted thereon from the truck frame.

11. In a brake mechanism for a wheel of a railway truck having a spring supported frame, in combination, a brake carrier member, a pair of brake shoes journaled thereon and operatively aligned with one peripheral side of said wheel, brake lever means pivotally connected to said carrier member and disposed substantially tangential of the wheel, a pair of brake shoes mounted on said brake lever means and operatively aligned with the other side of said wheel, fluid pressure operated brake cylinder means connected to said brake lever means and operative to cause said two pairs of brake shoes to clasp said wheel in braking relation therewith, torque responsive brake controlling valve means operative to effect supply and release of fluid under pressure to and from the brake cylinder means, and linkage mechanism operatively carried by the truck frame and supporting said carrier member and brake shoes for transmitting forces, resulting from braking torque produced during application of the brakes, to said torque responsive brake controlling valve means.

12. In a brake equipment for a railway truck having at least one wheel and axle assembly and a frame resiliently mounted thereon, in combination, a plurality of fluid pressure operated friction brake mechanisms adapted to be carried in braking relation with the wheels of said wheel and axle assembly, respectively, torque responsive brake controlling valve means for regulating operation of the brake mechanism of each wheel, individual torque lever devices for supporting each of said brake mechanisms from the truck frame and arranged to transmit braking torque therefrom to the associated brake controlling valve means regardless of the direction of the rotation of the wheel, and separate biasing means for each of said torque lever devices adapted to resist movement thereof out of a normal position with one predetermined force when the wheel and axle assembly is leading, and with a different opposing force when said assembly is trailing.

13. A brake mechanism for a wheel of a railway truck having a spring supported frame, comprising, in combination, friction brake means including a carrier member disposed longitudinally of the truck frame and parallel to said wheel, two bell crank levers arranged parallel to and journaled on opposite ends of said carrier member, a rod pivotally connecting oppositely disposed substantially vertical arms of said levers so that said levers can be turned in opposite directions only, spring means mounted on said carrier member for urging said rod toward a normal position and opposing longitudinal displacement of said rod in either direction, and hanger means mounted on said truck frame and pivotally secured to oppositely projecting longitudinal arms of said bell crank levers, whereby said rod and connected bell crank levers are operative against the force of said spring means to permit said friction brake means to follow vertical displacement of said wheel relative to said truck frame.

14. A brake mechanism for a wheel of a railway truck having a spring supported frame, comprising, in combination, friction brake means including a carrier member disposed longitudinally of the truck frame and parallel to said wheel, brake control means responsive to braking torque for automatically governing operation of said friction brake means, two spaced bell crank levers journaled on said truck frame above and in coplanar alignment with said carrier member, said bell crank levers having arms normally disposed in substantially vertical alignment and other arms normally extending in opposite directions horizontally, a horizontally arranged torque rod pivotally connected to said vertical arms of the bell crank levers, hanger members supporting said carrier member and pivotally connected to said other arms of the bell crank levers, and means for transmitting torque force, resulting from application of the brakes, from said torque rod to said torque responsive brake controlling means.

JOHN W. LOGAN, Jr.